(12) United States Patent
Gilbert

(10) Patent No.: US 9,017,584 B2
(45) Date of Patent: Apr. 28, 2015

(54) FLAME-RETARDANT MATERIALS AND SYSTEMS

(76) Inventor: Alan M. Gilbert, McKinney, TX (US)

( * ) Notice: Subject to any disclaimer, the term of this patent is extended or adjusted under 35 U.S.C. 154(b) by 629 days.

(21) Appl. No.: 12/434,430

(22) Filed: May 1, 2009

(65) Prior Publication Data

US 2010/0076116 A1   Mar. 25, 2010

Related U.S. Application Data

(63) Continuation-in-part of application No. 11/929,670, filed on Oct. 30, 2007.

(60) Provisional application No. 60/855,340, filed on Oct. 30, 2006.

(51) Int. Cl.
| | |
|---|---|
| *C09K 21/00* | (2006.01) |
| *C09D 5/18* | (2006.01) |
| *C09D 7/12* | (2006.01) |
| *C09K 21/02* | (2006.01) |
| *D06M 11/44* | (2006.01) |
| *D06M 11/79* | (2006.01) |
| *D06M 13/07* | (2006.01) |
| *D06M 15/227* | (2006.01) |
| *D06M 15/233* | (2006.01) |
| *D06M 15/564* | (2006.01) |
| *D06M 23/02* | (2006.01) |
| *D06M 23/04* | (2006.01) |
| *D06M 23/08* | (2006.01) |
| *C08K 3/34* | (2006.01) |
| *C08K 7/26* | (2006.01) |

(52) U.S. Cl.
CPC ... *C09D 5/18* (2013.01); *C08K 3/34* (2013.01); *C08K 7/26* (2013.01); *C09D 7/1291* (2013.01); *C09K 21/02* (2013.01); *D06M 11/44* (2013.01); *D06M 11/79* (2013.01); *D06M 13/07* (2013.01); *D06M 15/227* (2013.01); *D06M 15/233* (2013.01); *D06M 15/564* (2013.01); *D06M 23/02* (2013.01); *D06M 23/04* (2013.01); *D06M 23/08* (2013.01)

(58) Field of Classification Search
USPC .......... 252/605; 521/91, 79, 81, 93, 146; 424/9.52, 9.51, 489, 490
See application file for complete search history.

(56) References Cited

U.S. PATENT DOCUMENTS

| | | | |
|---|---|---|---|
| 5,648,508 A | 7/1997 | Yaghi | |
| 5,717,001 A * | 2/1998 | Books et al. | 521/91 |
| 6,254,852 B1 * | 7/2001 | Glajch et al. | 424/9.52 |
| 6,617,467 B1 | 9/2003 | Muller et al. | |
| 6,624,318 B1 | 9/2003 | Muller et al. | |
| 6,893,564 B2 | 5/2005 | Mueller et al. | |
| 6,929,679 B2 | 8/2005 | Muller et al. | |
| 6,930,193 B2 | 8/2005 | Yaghi et al. | |
| 7,008,607 B2 | 3/2006 | Muller et al. | |
| 7,119,219 B2 | 10/2006 | Mueller et al. | |
| 7,169,466 B2 * | 1/2007 | Taylor et al. | 428/317.9 |
| 7,179,765 B2 | 2/2007 | Mueller et al. | |
| 7,196,210 B2 | 3/2007 | Yaghi et al. | |
| 7,202,385 B2 | 4/2007 | Mueller et al. | |
| 7,279,517 B2 | 10/2007 | Mueller et al. | |
| 2004/0097724 A1 | 5/2004 | Muller et al. | |
| 2006/0100325 A1 | 5/2006 | Leite et al. | |
| 2006/0229402 A1 | 10/2006 | Varma | |
| 2007/0140951 A1 * | 6/2007 | O'Brien et al. | 423/592.1 |

FOREIGN PATENT DOCUMENTS

WO    WO 2004/015016    *   2/2004

* cited by examiner

*Primary Examiner* — Monique Peets
(74) *Attorney, Agent, or Firm* — Mark D. Perdue; John J. Patti

(57) ABSTRACT

A flame-retardant composition has a plurality of particles with a plurality of porosities formed therein, a flame retardant gas occupying the porosities, and a matrix material in which said particles are dispersed. It provides a sealant applied to at least a portion of the particles, wherein the sealant substantially prevents the gas from escaping the porosities. The matrix is a flame-retardant composition adapted to be applied to various surfaces. At least one of the matrix and the particles is formed of a material that will break down and release the gas in the presence of water. At least one of the matrix and the particles is formed of a material that will break down and release the gas in the presence of flame. The sealant may be a polymer material. This solves the problem of applying flame-retardant qualities to various surfaces.

16 Claims, No Drawings

US 9,017,584 B2

FLAME-RETARDANT MATERIALS AND SYSTEMS

RELATED APPLICATIONS

This application is a continuation-in-part to utility application Ser. No. 11/929,670, filed Oct. 30, 2007, which claims priority to provisional Application No. 60/855,340, filed Oct. 30, 2006, both by Alan Gilbert and entitled FLAME-RETARDANT MATERIALS AND SYSTEMS.

FIELD OF THE INVENTION

The invention relates generally to flame-retardant materials and, more particularly, to the use of nanocubes to store flame-retardant, non-flammable, or oxygen displacing gases; or zeolites for the same purpose, which are applied to or stored in various materials.

SUMMARY OF THE INVENTION

The invention includes a flame-retardant composition comprising a nanocube, metal organic framework or zeolite; both having a plurality of porosities formed therein; a flame-retardant material occupying the porosities; and a matrix material in which said material having a plurality of porosities are dispersed. The flame-retardant may further comprise a sealant applied to at least a portion of the material having a plurality of porosities, wherein the sealant substantially prevents the gas from escaping the porosities in the material. It may also include a composition wherein the matrix is a flame-retardant composition adapted to be applied to fabric. The invention may also include material having a plurality of porosities formed of a material that will break down and release the gas in the presence of water. The same material will also break down and release the gas in the presence of flame. The material having a plurality of porosities containing the flame-retardant material may also be sealed with a sealant that is a polymer material.

Another aspect of the invention includes a flame-retardant composition comprising a material having a plurality of porosities formed therein; a nonflammable, oxygen-displacing gas occupying the porosities; and a sealant applied to at least a portion of the material having a plurality of porosities, wherein the sealant substantially prevents the gas from escaping the porosities in the material having a plurality of porosities. This embodiment may also include a matrix that is a polymer material. This composition may include a matrix that is a flame-retardant composition adapted to be applied to a variety of substrates. This composition may include material having a plurality of porosities that are formed of a material that will break down and release the gas in the presence of water or material having a plurality of porosities formed of a material that will break down and release the gas in the presence of flame.

DETAILED DESCRIPTION

A number of unique substances known as nanocubes were discovered and studied at various universities around the United States. These nanocubes are of a family of organometallic (typically called metal organic frameworks or MOFs) materials that are highly crystalline, porous materials, having more free volume than most zeolites. The chemical functionality of the pores of these nanocubes or MOFs can be varied for used in storage or encapsulation of gases; thus allowing for an enormous storage capacity. One proposed stored gas is hydrogen for use as a fuel cell. One method of producing such nanocubes or MOFs is found in U.S. Pat. No. 7,119,219, issued Oct. 10, 2006, to Mueller et al. Other methods and resulting MOF structures can be found in U.S. Pat. Nos. 7,196,210; 6,930,193; and 5,648,508, all to Yaghi et al.

An example of such an existing nanocube is an isoreticular MOF that employs zinc-oxygen clusters ($Zn_4O$), which are tetrahedral clusters with the oxygen atom at the center of the tetrahedron, interconnected with benzene ring struts. Some of the benzene ring struts used have been 1,4-benzenedicarboxylate and a cyclobutyl-benzene strut. Namely, the cyclobutyl-benzene MOF has been used to encapsulate methane.

However, even with the advances in MOF or nanocube technology, applications for these substances are relatively limited. Moreover, the number of MOF substances remains relatively small (numbering less than 500). The preferred embodiment of the present invention, though, is directed toward an application of these MOFs or nanocubes, namely their use with fire-retardant compounds contained within them.

As with previously known nanocubes, the MOFs for use in flame-retardant applications include zinc-oxygen ($OZn_4$) clusters having benzene ring struts. The preferred MOF is known as MOF-177. MOF-177 is known to absorb up to 140 times its weight in gas, such as carbon dioxide ($CO_2$), at pressures between about 32 and 36 bar.

This and similar nanocubes or MOFs can be employed to contain or encapsulate or otherwise contain an oxygen displacing, non-flammable, or fire retardant gas, such as diatomic nitrogen, carbon dioxide, or argon. The gas is encapsulated by exposure of the MOF material to the gas at elevated pressure. In the case of MOF-177 and $CO_2$, a quantity of MOF particles are exposed to $CO_2$ at elevated pressure, preferably between 32 and 36 bar, thus impregnating the porous structure with a greater volume of gas than might be adsorbed at standard or ambient conditions.

Another substance exhibiting flame-retardant properties in accordance with the present invention is the zeolite. Zeolites are aluminosilicate minerals and have a microporous structure (pores smaller than 2 nm). As of January 2008, 175 unique zeolite frameworks have been identified, and over 80 naturally occurring zeolites are known. Zeolites have a porous structure (i.e., very high porosity) that can accommodate a wide variety of cations, such as $Na^+$, $K^+$, $Ca^{2+}$, $Mg^{2+}$ and others. These positive ions are rather loosely held and can readily be exchanged for others in a contact solution. Some of the more common mineral zeolites are analcime, chabazite, heulandite, natrolite, phillipsite, and stilbite. An example mineral formula is: $Na_2Al_2Si_3O_{10}$-$2H_2O$, the formula for natrolite.

Zeolites are the aluminosilicate members of the family of microporous solids known as "molecular sieves." The term molecular sieve refers to a particular property of these materials, i.e., the ability to selectively sort molecules based primarily on a size exclusion process. This is due to a very regular pore structure of molecular dimensions. The maximum size of the molecular or ionic species that can enter the pores of a zeolite is controlled by the dimensions of the channels. These are conventionally defined by the ring size of the aperture where, for example, the term "8-ring" refers to a closed loop that is built from 8 tetrahedrally coordinated silicon (or aluminum) atoms and 8 oxygen atoms.

Like MOFs, zeolites can be impregnated with a nonflammable, oxygen-displacing gas, such as $CO_2$, by exposure to the gas at elevated pressures, so that the porosities are filled with a greater volume of gas than might be adsorbed under standard temperature and pressure or ambient conditions. Both MOFs and zeolites are particles or particulate matter having high porosity and internal surface area capable of being impregnated with substantial volumes of gas.

Once the gas is contained or encapsulated within the MOF or zeolite, the flame-retardant nanocubes or MOFs may be sealed, preferably with a gas-impermeable polymer such as that disclosed in United States Patent Publication No. 2006-0229402, which is incorporated herein by reference.

The sealed MOFs or zeolites may optionally be combined into a matrix, preferably a paint or polymer material, such as polyethylene, polyurethane, polystyrene, or the like. The matrix, if an appropriate (i.e., substantially gas-impermeable) material, may form the sealant, or an additional gas-impermeable sealant may be applied to the gas-impregnated particles prior to dispersion in the matrix. The sealant and matrix also can be varied so as to release the encapsulated gas under different conditions, such as the application of heat or water. Specifically, a heat-reactive matrix containing sealed, gas-containing zeolites or nanocubes having a plurality of porosities is applied to (such as paint) or formed integrally (such as a polymer or plastic) into a substrate so that when the substrate reaches a desired temperature, the gas is released to extinguish or suppress the nearby flame.

As noted, in some instances, the matrix itself performs as the sealer. For example, the gas-filled nanocubes or MOFs are dispersed in a polymer in the molten state, the polymer then being formed into an object that has flame-retardant properties.

Both MOFs and zeolites may be applied to create flame-retardant applications. An example of a flame-retardant application is a flame-retardant fabric. Another example of a flame-retardant application is a flame-retardant paint. Under these conditions, the binder of the paint can operate as the sealant and the matrix in which the gas-containing zeolites or MOFs are dispersed. Thus, when the paint reaches its decomposition temperature, the gas is released to extinguish or suppress the nearby flame. Alternatively, a sealant separate from the components of the paint can be employed to seal the gas in the zeolite or nanocube. The temperature at which the gas is released then can be based upon the melting or decomposition temperature of the sealant rather than the paint itself.

Yet another example of a flame-retardant application is a flame-retardant foam. In this application, the foam operates as the matrix for containing the sealed nanocubes. This foam can be a polymeric or hardening foam (like polystyrene or polyurethane) operating primarily as an insulation or cushioning material or a semi-liquid or liquid form that can be dispersed onto fires. Again, the sealant can be the foam itself (in the case of a polymeric foam) or a separate material.

Still another example of a flame-retardant application is a polymer such as polyethylene or the like in which gas-containing zeolites or MOFs are dispersed. Again, the polymer itself could serve as the sealant or a separate sealant material can be provided to retain the gas in the porosities of the zeolite or nanocube material.

EXAMPLE

A flame-retardant composition according to the present invention was prepared and tested as follows. The following materials were obtained from the following suppliers:
Zeolite 5A (molecular sieves, powder) Sigma-Aldrich
Carbon dioxide gas (high purity, 99.99%) BOTCO Bryan, Tex. Olympic Inc.
FastHide ultra, gloss, white paint An appropriate amount of zeolite 5A was degassed at 300 C under vacuum conditions overnight (12 hours) to remove any adsorbates (such as water) from the zeolite. The degassed zeolite was then cooled to room temperature under a vacuum. Carbon dioxide gas was then introduced into a flask containing the degassed zeolite for 5 hours at a pressure of 800 torr. It is estimated that approximately 10% by weight of carbon dioxide was adsorbed by the degassed zeolite 5A. The degassed zeolite with carbon dioxide was mixed with a quantity of the paint.

Three different 2×10 inch papers were prepared and painted as follows: Sample S1 contained only paint without zeolite; sample S2 contained 25% by weight of degassed (as above) zeolite without $CO_2$; and sample S3 was prepared with 25% by weight of $CO_2$ adsorbed zeolite (as above). Lastly, sample S4 was prepared the same way as sample S3 except the samples were left on a shelf under ambient conditions at room temperature for three weeks.

Each sample was tested with a flame propagation tester. The papers painted with only paint (S1) and with 25% by weight zeolite 5A without $CO_2$ (S2) burned within several seconds. However, carbon dioxide adsorbed zeolite 5A added samples (S3) showed drastic retardation of the flame and the fire was extinguished under the sample experimental condition. It is clear that carbon dioxide released from the zeolite at elevated temperatures in the presence of flame retards and extinguishes the fire.

To investigate the long-term stability of $CO_2$ adsorbed zeolite containing paint, the S4 samples were kept at room temperature under ambient conditions for 3 weeks as described above. S4 samples produced the same results as S3 samples, i.e., all of the S4 samples extinguished the fire upon burning.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A flame-retardant composition comprising:
    a plurality of particles, each particle having a plurality of porosities;
    a nonflammable gas occupying the porosities at a pressure elevated above ambient conditions; and
    a gas-impermeable, sealant on each of the particles, the sealant maintaining the gas at elevated pressure in the porosities and preventing escape of the gas from the porosities, the sealant breaking down to release the gas from the porosities under selected conditions, wherein the sealant is a matrix material in which the particles are dispersed.

2. The composition according to claim 1, wherein the nonflammable gas is carbon dioxide.

3. The composition according to claim 1, wherein the particles are nanocubes.

4. The composition according to claim 1, wherein the particles are zeolites.

5. The composition according to claim 1, wherein the sealant is formed of a material that will break down and release the gas in the presence of heat or flame.

6. The composition according to claim 1, further comprising a sealant which is a gas-impermeable polymer material.

7. A flame-retardant composition comprising:
   a plurality of particles, each particle having a plurality of porosities;
   a nonflammable, oxygen-displacing gas occupying the porosities at a pressure elevated above ambient conditions; and
   a gas-impermeable, polymer sealant applied to at least a portion of each of the particles, wherein the sealant prevents the gas from escaping the porosities in the particles until exposure to heat or flame.

8. The composition according to claim 7, wherein the sealant is a matrix material in which the particles are dispersed.

9. The composition according to claim 7, wherein the nonflammable, oxygen-displacing gas is carbon dioxide.

10. The composition according to claim 7, wherein the sealant will break down and release the gas in the presence of water.

11. The composition according to claim 7, wherein the particles are metal organic frameworks.

12. A flame-retardant composition comprising:
    a plurality of particles, each particle having a plurality of porosities;
    a nonflammable gas occupying the porosities at a pressure elevated above ambient conditions; and
    a gas-impermeable, polymer sealant on each of the particles, the sealant maintaining the gas at elevated pressure in the porosities and preventing escape of the gas from the porosities, the sealant breaking down to release the gas from the porosities under selected conditions.

13. The composition according to claim 12, wherein the sealant is a matrix material in which the particles are dispersed.

14. The composition according to claim 12, wherein the nonflammable, oxygen-displacing gas is carbon dioxide.

15. The composition according to claim 12, wherein the sealant will break down and release the gas in the presence of water.

16. The composition according to claim 12, wherein the particles are metal organic frameworks.

* * * * *